(12) United States Patent
Kwon et al.

(10) Patent No.: US 9,786,893 B2
(45) Date of Patent: Oct. 10, 2017

(54) FLEXIBLE ELECTROCHEMICAL DEVICE INCLUDING ELECTRICALLY CONNECTED ELECTRODE ASSEMBLIES

(71) Applicant: Samsung Electronics Co., Ltd., Suwon-si, Gyeonggi-do (KR)

(72) Inventors: Moonseok Kwon, Hwaseong-si (KR); Jaeman Choi, Seongnam-si (KR); Euncheol Do, Seoul (KR); Jaejun Chang, Seoul (KR); Yeonji Chung, Yongin-si (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 218 days.

(21) Appl. No.: 14/750,454

(22) Filed: Jun. 25, 2015

(65) Prior Publication Data

US 2016/0099454 A1  Apr. 7, 2016

(30) Foreign Application Priority Data

Oct. 2, 2014  (KR) ........................ 10-2014-0133556

(51) Int. Cl.
*H01M 10/50* (2006.01)
*H01M 2/02* (2006.01)
(Continued)

(52) U.S. Cl.
CPC ......... *H01M 2/204* (2013.01); *H01M 2/0212* (2013.01); *H01M 2/0267* (2013.01);
(Continued)

(58) Field of Classification Search
CPC .... H01M 2/204; H01M 2/021; H01M 2/0212; H01M 2/0267; H01M 2/0275;
(Continued)

(56) References Cited

U.S. PATENT DOCUMENTS 2,798,895 A * 7/1957 Nowotny ............. H01G 13/006
429/153
2009/0023057 A1* 1/2009 Kim .................... H01M 2/0207
429/120
(Continued)

FOREIGN PATENT DOCUMENTS

KR  1020070108580 A  11/2007
KR   100870355 B1    11/2008
(Continued)

*Primary Examiner* — Helen O Conley
(74) *Attorney, Agent, or Firm* — Cantor Colburn LLP

(57) ABSTRACT

A flexible electrochemical device in which a plurality of electrode assemblies is electrically connected to each other so that the flexible electrochemical device may be repeatedly bent, includes at least two electrode assemblies that are arranged separate from each other and a casing member that packs the at least two electrode assemblies and includes at least two accommodation portions in which electrode assemblies are individually received, and a connecting portion that connects the at least two adjacent accommodation portions where a path between a conductive line that electrically connects at least two electrode assemblies together and an electrolyte is defined in the connecting portion.

24 Claims, 16 Drawing Sheets

(51) Int. Cl.
*H01M 2/08* (2006.01)
*H01M 2/20* (2006.01)
*H01M 2/24* (2006.01)
*H01M 2/26* (2006.01)
*H01M 6/46* (2006.01)
*H01M 10/04* (2006.01)
*H01M 10/0587* (2010.01)

(52) U.S. Cl.
CPC ........... *H01M 2/0275* (2013.01); *H01M 2/24* (2013.01); *H01M 2/263* (2013.01); *H01M 6/46* (2013.01); *H01M 10/0436* (2013.01); *H01M 2/021* (2013.01); *H01M 10/0431* (2013.01); *H01M 10/0587* (2013.01); *H01M 2002/0205* (2013.01); *H01M 2220/30* (2013.01)

(58) Field of Classification Search
CPC .... H01M 2/24; H01M 2/263; H01M 10/0431; H01M 10/0436; H01M 10/0587
See application file for complete search history.

(56) References Cited

U.S. PATENT DOCUMENTS

| | | |
|---|---|---|
| 2011/0183169 A1 | 7/2011 | Bhardwaj et al. |
| 2013/0171490 A1* | 7/2013 | Rothkopf ............ H01M 2/0207 429/120 |
| 2014/0057147 A1 | 2/2014 | Andrew et al. |

FOREIGN PATENT DOCUMENTS

| | | |
|---|---|---|
| KR | 1020130014252 A | 2/2013 |
| KR | 1020130133332 A | 12/2013 |

* cited by examiner

FLEXIBLE ELECTROCHEMICAL DEVICE INCLUDING ELECTRICALLY CONNECTED ELECTRODE ASSEMBLIES

RELATED APPLICATION

This application claims the benefit to Korean Patent Application No. 10-2014-0133556, filed on Oct. 2, 2014, and all the benefits accruing therefrom under 35 U.S.C. §119, the content of which in its entirety is herein incorporated by reference.

BACKGROUND

1. Field

Exemplary embodiments of the invention relate to electrochemical devices including electrode assemblies, and more particularly, to flexible electrochemical devices in which a plurality of electrode assemblies is electrically connected to each other so that the flexible electrochemical devices may be repeatedly bent.

2. Description of the Related Art

Secondary batteries are electrochemical devices that are manufactured to be charged and discharged, unlike primary batteries that cannot be charged. The secondary batteries are widely used in a field of high-tech electronic devices, such as cellular phones, notebook computers, and camcorders.

In particular, lithium secondary batteries have an advantage of higher voltages than those of nickel-cadmium batteries or nickel-hydrogen batteries that are widely used for portable electronic equipment power supply, and an advantage of high energy density per unit weight, for example. Therefore, the demand for lithium secondary batteries is increasing. In the lithium secondary batteries, a lithium-based oxide is mainly used for a cathode active material, and a carbon based material is mainly used for an anode active material. In general, the lithium secondary batteries are classified into liquid electrolyte batteries and polymer electrolyte batteries according to a type of an electrolyte. Batteries that use a liquid electrolyte are referred to as lithium ion batteries, and batteries that use a polymer electrolyte are referred to as lithium polymer batteries. Also, the lithium secondary batteries are manufactured in various shapes such as a cylindrical battery, a prismatic battery, and a pouch-type battery. Conventionally, jelly-roll type electrode assemblies in which a separator is inserted between a positive electrode plate and a negative electrode plate and the positive electrode plate and the negative electrode plate are rolled in a spiral form together with the separator, or stack-type electrode assemblies in which a positive electrode plate and a negative electrode plate are repeatedly stacked and a separator is inserted between the positive electrode plate and the negative electrode plate, are widely used in the lithium secondary batteries.

As attention for flexible electronic devices that can be flexibly bent is increasing, research into manufacturing flexible batteries that can be used in flexible electronic devices is increasing.

SUMMARY

Exemplary embodiments will be set forth in part in the description which follows and, in part, will be apparent from the description, or may be learned by practice of the presented exemplary embodiments.

According to an exemplary embodiment of an exemplary embodiment, an electrochemical device includes a first electrode assembly and a second electrode assembly that are separate from each other, at least one conductive line that electrically connects the first electrode assembly and the second electrode assembly, a casing member that packages the first and second electrode assemblies and includes a first accommodation portion in which the first electrode assembly is accommodated, a second accommodation portion in which the second electrode assembly is accommodated, and a connecting portion that connects the first accommodation portion to the second accommodation portion, and an electrolyte disposed in the casing member, wherein a thickness of the connecting portion is less than thicknesses of the first accommodation portion and the second accommodation portion, and a path for the at least one conductive line and the electrolyte is provided in the connecting portion.

In an exemplary embodiment, the casing member may include a lower casing member and an upper casing member, and a space may be disposed between the lower casing member and the upper casing member so that the path for the at least one conductive line and the electrolyte is disposed between the lower casing member and the upper casing member.

In an exemplary embodiment, a thickness of the connecting portion in a region in which the at least one conductive line is located may be greater than a thickness of the connecting portion in a region in which the at least one conductive line is not located.

In an exemplary embodiment, a thickness of the connecting portion in at least a region in which the at least one conductive line is not located may be larger than a sum of thicknesses of the lower casing member and the upper casing member of the connecting portion in a region in which the at least one conductive line is located.

In an exemplary embodiment, a space may be defined between a surface of the at least one conductive line and the lower or upper casing member.

In an exemplary embodiment, a concave curved surface may be provided on a surface of the lower casing member or the upper casing member in a region of the connecting portion.

In an exemplary embodiment, the at least one conductive line may include a first conductive line and a second conductive line that are spaced apart from each other on the same plane in parallel, and the lower casing member and the upper casing member may be bonded to each other in at least one region among a region between the first conductive line and the second conductive line in the connecting portion, a region between a first edge of the connecting portion and the first conductive line, and a region between a second edge of the connecting portion and the second conductive line.

In an exemplary embodiment, the first and second electrode assemblies may be disposed to face a top surface of the at least one conductive line, and the lower casing member may be disposed to face bottom surfaces of the first and second electrode assemblies, and the upper casing member may be disposed on the first and second electrode assemblies and may have shapes of the first and second accommodation portions and the connecting portion.

In an exemplary embodiment, the first electrode assembly may be disposed to face a top surface of the at least one conductive line, and the second electrode assembly may be disposed to face a bottom surface of the at least one conductive line, and the first accommodation portion may be provided in the upper casing member, and the second accommodation portion may be provided in the lower casing member.

In an exemplary embodiment, each of the lower casing member and the upper casing member may include an outermost layer, a gas barrier layer, and a sealing layer.

In an exemplary embodiment, the casing member may further include a reinforcement member provided in a border region between the first accommodation portion and the connecting portion or between the second accommodation portion and the connecting portion.

In an exemplary embodiment, a curved surface may be provided in at least one of a top surface of the first accommodation portion, a bottom surface of the first accommodation portion, a top surface of the second accommodation portion, and a bottom surface of the second accommodation portion.

In an exemplary embodiment, a curved surface may be provided in at least one of a top surface of the first electrode assembly, a bottom surface of the first electrode assembly, a top surface of the second electrode assembly, and a bottom surface of the second electrode assembly.

In an exemplary embodiment, the connecting portion may be bent so that the first accommodation portion is inclined with respect to the second accommodation portion.

In an exemplary embodiment, the at least one conductive line may be a sheet-type conductive line that extends between the first accommodation portion and the second accommodation portion through the connecting portion in the casing member and may include a sheet region of which a width is greater than a thickness of the sheet region.

In an exemplary embodiment, the at least one conductive line may include a first conductive line and a second conductive line that connect the first and second electrode assemblies together in parallel, and the electrochemical device may further include first electrode tabs that electrically connect the first and second electrode assemblies to the first conductive line and second electrode tabs that electrically connect the first and second electrode assemblies to the second conductive line.

In an exemplary embodiment, the electrochemical device may further include an insulating layer, wherein the at least one conductive line is disposed on a bottom surface of the insulating layer or a top surface of the insulating layer.

In an exemplary embodiment, each of the first and second electrode assemblies may include a current collector, and at least one of the current collectors of the first and second electrode assemblies and the at least one conductive line may be unitary.

In an exemplary embodiment, a width of the at least one conductive line in a region of the connecting portion may be less than that in other regions.

In an exemplary embodiment, the electrochemical device may further include at least one lead tab that is drawn to an outside of the casing member and is electrically connected to the at least one conductive line in the casing member.

In an exemplary embodiment, a part of the conductive line is bent in the casing member and the bent part of the conductive line and the lead tab may be bonded to each other.

In an exemplary embodiment, a height of the lead tab and a height of the conductive line may not coincide with each other in the casing member, and a part of the lead tab or the conductive line may be slantly bent and may be bonded to the conductive line or the lead tab.

In an exemplary embodiment, the at least one conductive line may include a third conductive line disposed between the first electrode assembly and the second electrode assembly, and the electrochemical device may further include electrode tabs that electrically connect the third conductive line to the first and second electrode assemblies and are led out from each of the first and second electrode assemblies.

In an exemplary embodiment, the at least one conductive line may have a shape in which the at least one conductive line is bent along surfaces of the first accommodation portion and the connection portion or along surfaces of the second accommodation portion and the connection portion.

BRIEF DESCRIPTION OF THE DRAWINGS

These and/or other exemplary embodiments, advantages and features of this disclosure will become apparent and more readily appreciated from the following description of the exemplary embodiments, taken in conjunction with the accompanying drawings in which.

DETAILED DESCRIPTION

Figure 1:
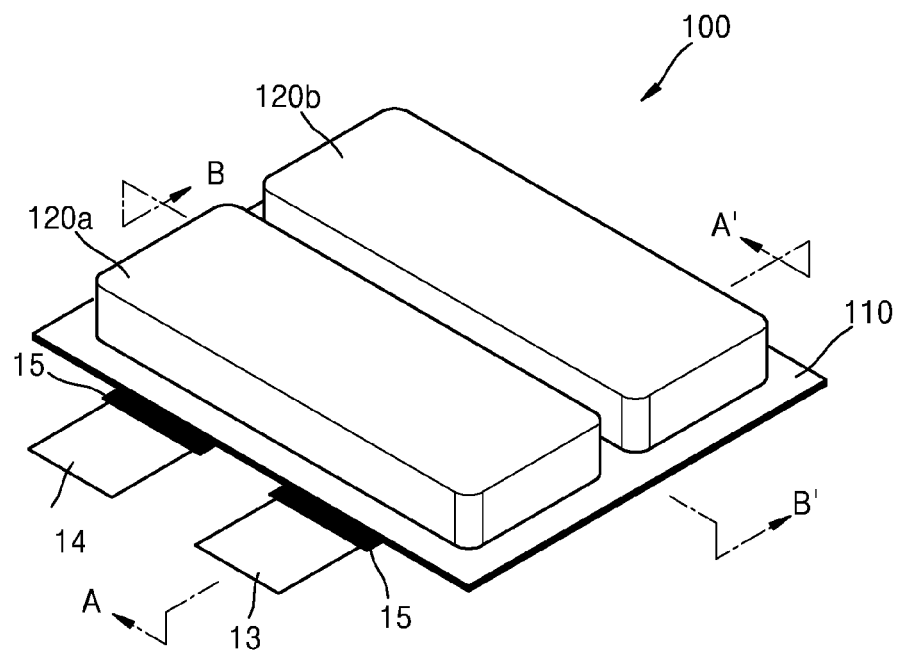
FIG. 1 is a perspective view of a structure of an electrochemical device according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain exemplary embodiments.

Hereinafter, a flexible electrochemical device including electrode assemblies electrically connected to each other will be described in detail with reference to the attached drawings. In the following drawings, like reference numerals denote like elements, and sizes of elements in the drawings may be exaggerated for clarity and convenience of explanation. Also, the following embodiments are just illustrative, and various modifications are possible from these embodiments. Also, in a layer structure that will be described later, it will be understood that when a layer is referred to as being "formed at an upper portion of or on," another layer, it can be directly formed on the other layer or in non-contact with the other layer.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
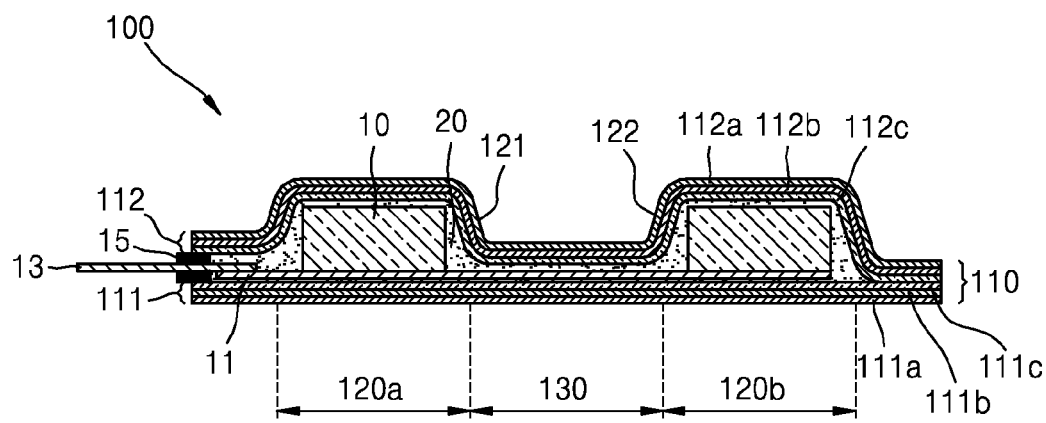
FIG. 2 is a cross-sectional view of a structure of the electrochemical device, taken along line A-A' of FIG. 1.

FIG. 1 is a perspective view of a structure of an electrochemical device 100 according to an exemplary embodiment, and FIG. 2 is a cross-sectional view of a structure of the electrochemical device 100, taken along line A-A' of FIG. 1. Referring to FIGS. 1 and 2, the electrochemical device 100 according to the embodiment may include at least two electrode assemblies 10 that are arranged separate from each other along one direction, and a casing member 110 including the at least two electrode assemblies 10. The casing member 110 may include at least two accommodation portions 120a and 120b in which at least two electrode assemblies 10 are respectively disposed, and a connecting portion 130 that connects the two adjacent accommodation portions 120a and 120b. In FIGS. 1 and 2, two accommodation portions 120a and 120b and one connecting portion 130 are illustrated. However, embodiments are not limited thereto. In other exemplary embodiments, the electrochemical device 100 may include three or more accommodation portions and two or more connecting portions 130 according to the number of electrode assemblies 10.

Also, the electrochemical device 100 may further include an electrolyte 20 disposed in the casing member 110 together with the electrode assemblies 10. The electrolyte 20 may be disposed in both the accommodation portions 120a and 120b and the connecting portion 130. In exemplary embodiments, various types of electrolytes, such as a liquid electrolyte, a gel-polymer electrolyte, and a solid electrolyte, may be used as the electrolyte 20. In order to maintain the electrochemical device 100 in an air-tight state, a fluid may be further filled in the casing member 110 together with the electrolyte 20. When a pressure inside the casing member 110 is maintained to be lower than a pressure outside the casing member 110, external gas may be introduced into the electrochemical device 100 so that performance of the electrochemical device 100 is lowered. In order to prevent this problem, the fluid may be further filled in the casing member 110 so that the pressure inside the casing member 110 may be maintained to be higher than or equal to the pressure outside the casing member 110. When the electrolyte 20 having the property of the fluid is used, the electrolyte 20 may serve as a fluid that increases the pressure inside the casing member 110. In an exemplary embodiment, when the electrolyte 20 is a solid electrolyte, a separate fluid, such as gas, may be filled in the casing member 110.

The casing member 110 may include a lower casing member 111 and an upper casing member 112. As illustrated in FIG. 2, the plurality of accommodation portions 120a and 120b may be defined below the upper casing member 112, and the lower casing member 111 may have an overall flat shape. In an exemplary embodiment, the lower casing member 111 having a flat shape may be disposed to face a bottom surface of each of the electrode assemblies 10, and the upper casing member 112 that is bent to have shapes of the plurality of accommodation portions 120a and 120b and the connecting portion 130 may be disposed on the lower casing member 111. Thus, the upper casing member 112 may surround surfaces of each electrode assembly 10 except for the bottom surface of each electrode assembly 10. That is, the lower casing member 111 may constitute a lower surface of each of the accommodation portions 120a and 120b, and the upper casing member 112 may constitute the other surfaces (e.g., side surfaces and a top surface) of the accommodation portions 120a and 120b, for example. Edges of the lower casing member 111 and edges of the upper casing member 112 may be solidly bonded to each other so that the electrode assemblies 10 and the electrolyte 20 may not be exposed to the outside.

Also, as illustrated in FIG. 2, the lower casing member 111 and the upper casing member 112 may include a plurality of layers. In an exemplary embodiment, the lower casing member 111 may include an outermost layer 111a, a gas barrier layer 111b, and a sealing layer 111c, for example. Similarly, the upper casing member 112 may include an outermost layer 112a, a gas barrier layer 112b, and a sealing layer 112c. In an exemplary embodiment, materials of the gas barrier layers 111b and 112b may include metals, such as aluminum (Al), copper (Cu), stainless steel, and an alloy thereof. Although the gas barrier layers 111b and 112b. are single layers, as shown in FIG. 2, the gas barrier layers 111b and 112b may be provided to have a multi-layer structure. In an exemplary embodiment, when the gas barrier layers 111b and 112b are provided to have the multi-layer structure, the gas barrier layers 111b and 112b may include a metal layer and a polymer layer, which are stacked. In an exemplary embodiment, the sealing layers 111c and 112c may include polyolefin-based thermoplastic resin, for example, polyethylene ("PE") or polypropylene ("PP").

The lower casing member 111 and the upper casing member 112 of the casing member 110 may be unitary, or may be separately provided and then bonded to each other. In an exemplary embodiment, FIG. 3 is a perspective view of an integrated casing member 110, and FIG. 4 is a perspective view of the combined casing member 110.

Figure 3:
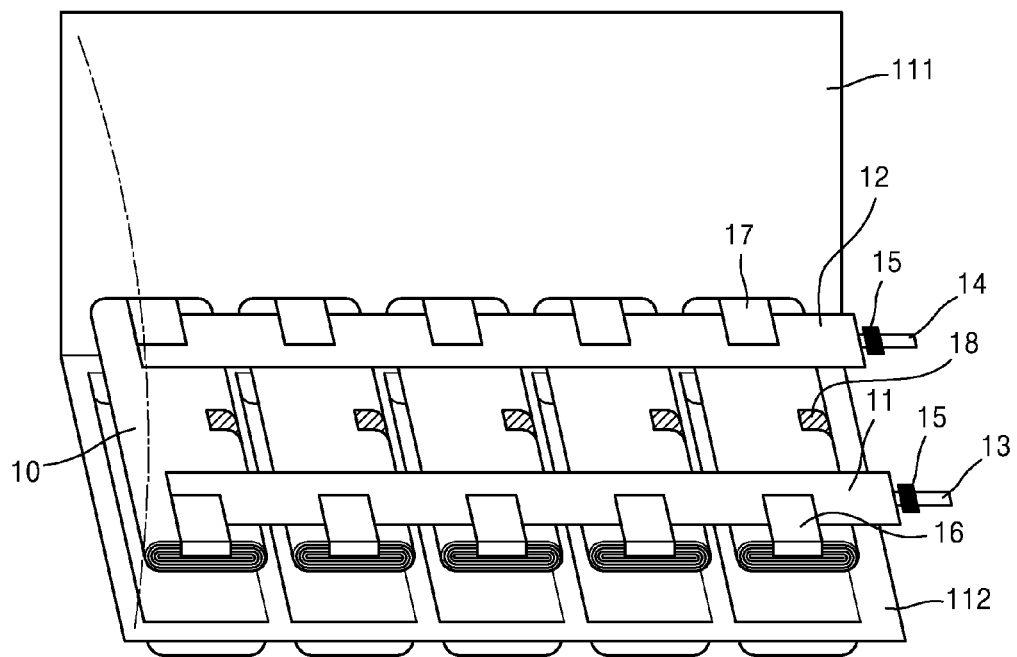
FIG. 3 is a perspective view of an integrated casing member.

Referring to FIG. 3, when the lower casing member 111 and the upper casing member 112 are unitary, one edge of the upper casing member 112 may be connected to one edge of the lower casing member 111, and the connected portion between the lower casing member 111 and the upper casing member 112 may be folded. Then, when the electrochemical device 100 is provided, after a plurality of electrode assemblies 10 is arranged on the lower casing member 111, the connected portion between the lower casing member 111 and the upper casing member 112 may be folded in such a way that the upper casing member 112 may cover the plurality of electrode assemblies 10. Then, the upper casing member 112 is pressed in such a way that a plurality of accommodation portions 120a and 120b and the connecting portion 130 may be provided and then, three other edges of the upper casing member 112 and the lower casing member 111 may be bonded to each other. The electrolyte 20 may be injected between the upper casing member 112 and the lower casing member 111 before the upper casing member 112 and the lower casing member 111 are finally bonded to each other. As illustrated in FIG. 3, the plurality of electrode assemblies 10 may be arranged in a line along a lengthwise direction (e.g., a direction extending along line A-A' of FIG. 1) of the casing member 110 (refer to FIG. 2), and the plurality of accommodation portions 120a and 120b defined on the upper casing member 112 may be arranged in a line along the lengthwise direction of the casing member 110.

Figure 4:
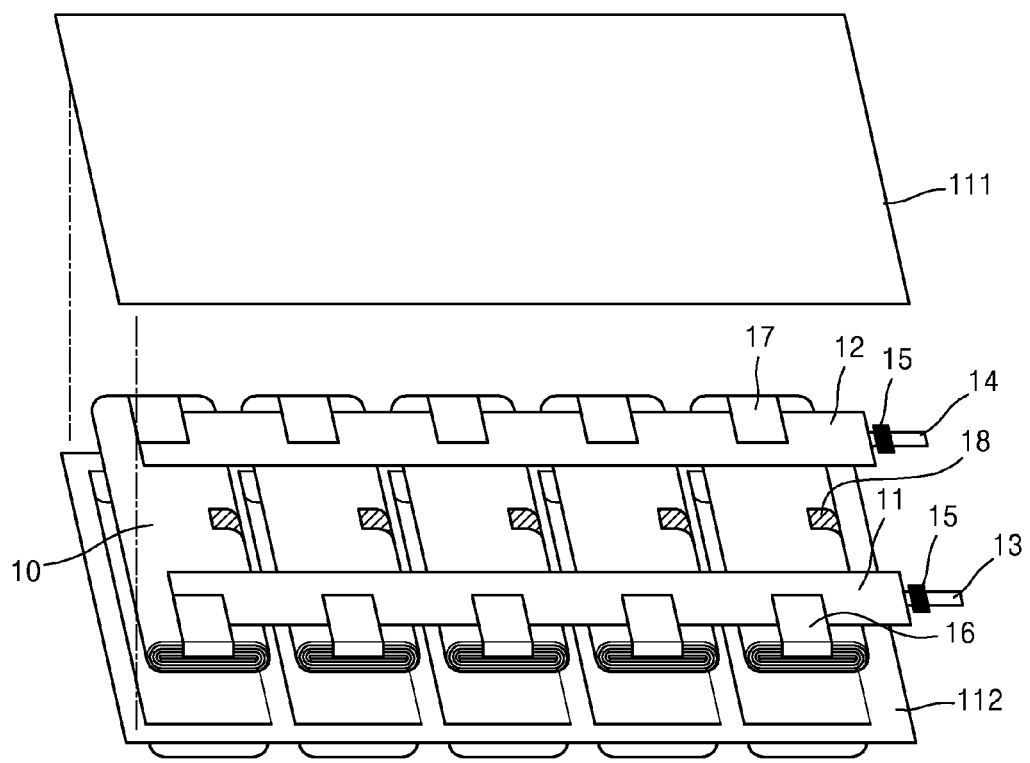
FIG. 4 is a perspective view of a combined casing member.

Referring to FIG. 4, when the lower casing member 111 and the upper casing member 112 are separately provided, the electrode assemblies 10 are arranged on the lower casing member 111 and then, a separate upper casing member 112 may cover the electrode assemblies 10. Then, the upper casing member 112 may be pressed in such a way that the accommodation portions 120a and 120b and the connecting portion 130 may be defined, and the four contacting edges of the upper casing member 112 and the lower casing member 111 may be bonded to each other.

When the upper casing member 112 is pressed, a press mold having shapes of the accommodation portions 120a and 120b and the connecting portion 130 may be used. Then, a space having a sufficient thickness in which the electrode assemblies 10 and the electrolyte 20 may be accommodated, may be defined in the accommodation portions 120a and 120b. In another exemplary embodiment, the upper casing member 112 in which the shapes of the accommodation portions 120a and 120b and the connecting portion 130 are provided in advance, instead of pressing the upper casing member 112, may be used.

Figure 5:
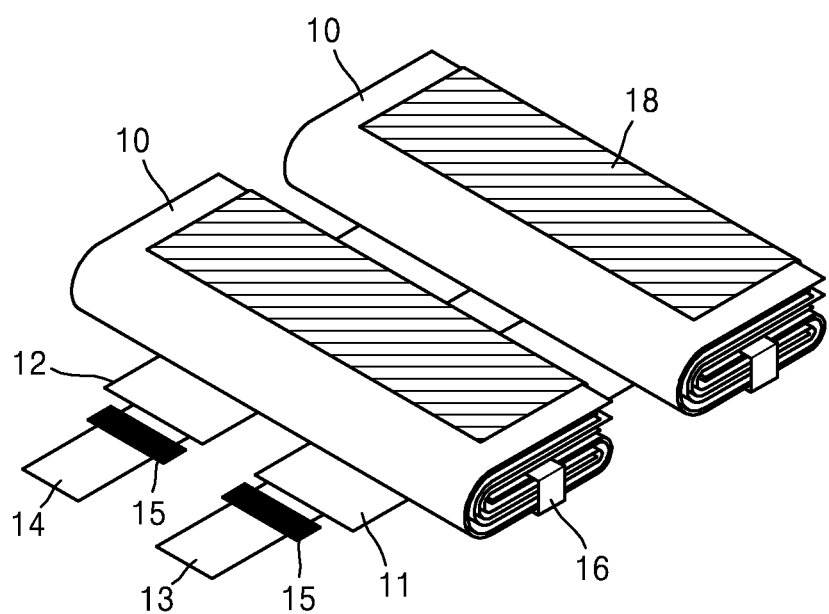
FIG. 5 is a perspective view of an arrangement of electrode assemblies inside the casing member.

FIG. 5 is a perspective view of an arrangement of the electrode assemblies 10 inside the casing member 110. Referring to FIG. 5, the electrochemical device 100 according to the embodiment may further include first and second conductive lines 11 and 12 that electrically connect at least two electrode assemblies 10 together, and first and second lead tabs 13 and 14 that electrically connect external electrode terminals to the first and second conductive lines 11 and 12. The first and second conductive lines 11 and 12 may extend along a lengthwise direction in which at least two electrode assemblies 10 are arranged, and may be spaced apart from each other and may be disposed in parallel to each other. Thus, the first and second conductive lines 11 and 12 may face one outer surface of each of the electrode assemblies 10. In an exemplary embodiment, the first and second conductive lines 11 and 12 may be sheet-type conductive lines having sheet regions of which widths are greater than their thicknesses, for example. In an exemplary embodiment, thicknesses of the first and second conductive lines 11 and 12 may be about 4 micrometers (μm) to about 400 μm, and widths of the first and second conductive lines 11 and 12 may be 5 to 10,000 times the thicknesses of the first and second conductive lines 11 and 12, for example.

The first and second conductive lines 11 and 12 may connect at least two electrode assemblies 10 in parallel. In order to electrically connect the electrode assemblies 10 to the first and second conductive lines 11 and 12, the electrochemical device 100 may further include electrode tabs. The perspective view of FIG. 5 illustrates only a first electrode tab 16 that connects the first conductive line 11 to the electrode assemblies 10. However, the electrochemical device 100 may include a second electrode tab 17 (see FIG. 3) that connects the second conductive line 12 to the electrode assemblies 10.

In general, each of the electrode assemblies 10 may include a positive electrode plate, a negative electrode plate, and a separator disposed between the positive electrode plate and the negative electrode plate. Each electrode assembly 10 may be a roll-type electrode assembly having a shape of a jelly roll in which a positive electrode plate and a negative electrode plate are rolled with a separator that is between the positive electrode plate and the negative electrode plate, a folding-type electrode assembly that is provided by folding a part of a positive electrode plate and a negative electrode plate that have a separator that is disposed between the positive electrode plate and the negative electrode plate, and or a stack-type electrode assembly that is provided by stacking a plurality of positive electrode plates and a plurality of negative electrode plates with a separator that is between the plurality of positive electrode plates and the plurality of negative electrode plates. When the roll-type electrode assembly, the folding-type electrode assembly, or the stack-type electrode assembly is used, an insulating tape 18 may be at least partially attached to a circumference of the electrode assembly 10 so that the positive electrode plate, the negative electrode plate, and the separator may not be separated in each electrode assembly 10. FIG. 5 illustrates a roll-type electrode assembly. However, the shape of the electrode assembly 10 is not limited thereto. In an exemplary embodiment, the first electrode tab 16 may electrically connect the positive electrode plate of the electrode assembly 10 and the first conductive line 11, for example, and a second electrode tab 17 may electrically connect the negative electrode plate of the electrode assembly 10 and the second conductive line 12.

The first lead tab 13 may be electrically connected to the first conductive line 11 in the casing member 110, and the second lead tab 14 may also be electrically connected to the second conductive line 12 in the casing member 110. Although the first and second lead tabs 13 and 14 and the first and second conductive lines 11 and 12 may be separately provided and connected to each other, ends of the first and second conductive lines 11 and 12 may be drawn to the outside of the electrochemical device 100 so that ends of the first and second conductive lines 11 and 12 may be used as the first and second lead tabs 13 and 14. The first and second lead tabs 13 and 14 may be disposed between the lower casing member 111 and the upper casing member 112 and may be drawn outwardly through the casing member 110. In order to securely seal a region between the lower casing member 111 and the upper casing member 112 in which the first and second lead tabs 13 and 14 are disposed, a sealing member 15 may be further disposed in a middle portion of the first and second lead tabs 13 and 14. In an exemplary embodiment, the sealing member 15 may include a thermoplastic material, for example, PE or PP.

As illustrated in FIGS. 1 and 2, the connecting portion 130 of the electrochemical device 100 according to the embodiment may be provided thinner than the accommodation portions 120 and 120b. Also, the connecting portion 130 may be connected to a lower region of two facing surfaces of two adjacent accommodation portions 120a and 120b. In an exemplary embodiment, the connecting portion 130 may be connected between a lower region of a first side surface 121 of the left accommodation portion 120a and a lower region of a second side surface 122 of the right accommodation portion 120b, for example. The connecting portion 130 is provided to have a sufficiently small thickness so that the electrochemical device 100 may be flexibly folded. Here, the thickness may be defined as a maximum distance between the lower casing member 111 and the upper casing member 112. In an exemplary embodiment, the thicknesses of the accommodation portions 120a and 120b may be two times greater than the thickness of the connecting portion 130.

Also, the connecting portion 130 may serve as a path between the first and second conductive lines 11 and 12 and the electrolyte 20. To this end, a part of the lower casing member 111 and a part of the upper casing member 112 that constitute the connecting portion 130 are not bonded to each other and thus, a space may be defined between the lower casing member 111 and the upper casing member 112. Then, the first and second conductive lines 11 and 12 extend through an internal space of the connecting portion 130 and thus may electrically connect different electrode assemblies 10 disposed in different accommodation portions 120a and 120b. Also, since the electrolyte 20 may communicate with the plurality of accommodation portions 120a and 120b using the connecting portion 130 and may function with the plurality of electrode assemblies 10, the plurality of electrode assemblies 10 may show a uniform performance.

The connecting portion 130 of electrochemical device 100, which connects the accommodation portions 120a and 120b, according to the embodiment may have a small thickness, and thus, the electrochemical device 100 may be easily bent. Thus, the reliability and durability of bending deformation may be improved. Since the first and second conductive lines 11 and 12 pass through the connecting portion 130 and the plurality of electrode assemblies 10 may be electrically connected to each other via the first and second conductive lines 11 and 12, a power capacity of the electrochemical device 100 may be sufficiently increased when necessary. Also, since the electrolyte 20 functions with the plurality of electrode assemblies 10 using the connecting portion 130, the plurality of electrode assemblies 10 may show a uniform performance. The electrochemical device 100 may be easily bent, and thus, may be applied to any type of electronic device and may enable implementation of a flexible electronic device.

Figure 6:
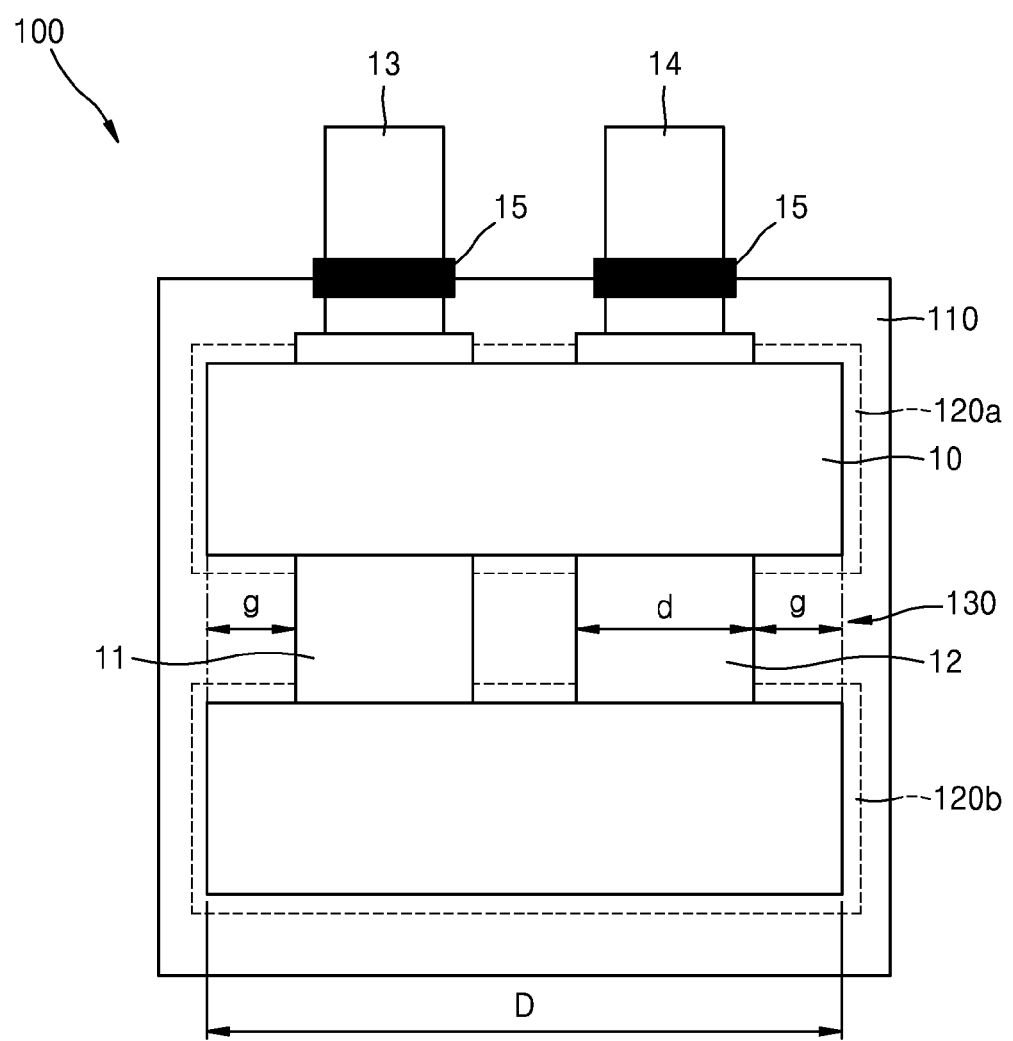
FIG. 6 is a plan view of an arrangement of electrode assemblies and conductive lines disposed in the casing member of the electrochemical device.

Also, the electrochemical device 100 according to the embodiment is configured to suppress a volume increase of the electrochemical device 100, and thus, may have a high energy density. In an exemplary embodiment, FIG. 6 is a plan view of an arrangement structure of the electrode assemblies 10 and the first and second conductive lines 11 and 12 disposed in the casing member 110 of the electrochemical device 100, for example. Referring to FIG. 6, a width d of each of the first and second conductive lines 11 and 12 may be less than a width D of each electrode assembly 10. In particular, a sum 2d of a width d of the first conductive line 11 and a width d of the second conductive line 12 may be less than the width D of each electrode assembly 10. Thus, both the first and second conductive lines 11 and 12 may be disposed inside the electrode assembly 10. That is, both widthwise edges of the electrode assembly 10 may protrude by a gap g compared to edges of the first and second conductive lines 11 and 12. Thus, a consumed space is minimized so that the electrochemical device 100 may have a high energy density.

If the first and second conductive lines 11 and 12 within the connecting portion 130 are totally fixed to a sealing layer 111c of the lower casing member 111 and a sealing layer 112c of the upper casing member 112, it may be difficult to bend the electrochemical device 100, and it is easy to damage the first and second conductive lines 11 and 12 or the lower and upper casing members 111 and 112. Thus, the first and second conductive lines 11 and 12 and the sealing layers 111c and 112c of the lower casing member 111 and upper casing member 112 are weakly bonded to each other so that at least a partial region between the first and second conductive lines 11 and 12 and the sealing layers 111c and 112c may be widened due to stress that occurs when the electrochemical device 100 is bent and a space may be defined between the lower casing member 111 and the upper casing member 112. In this case, a relative position movement between the first and second conductive lines 11 and 12 and the sealing layers 111c and 112c occurs so that stress that occurs when the electrochemical device 100 is bent may be alleviated. To this end, the first and second conductive lines 11 and 12 may comprise a metal material that is not strongly bonded to polyolefin-based sealing layers 111c and 112c, or not a polyolefin-based but polymer material.

Figure 7:
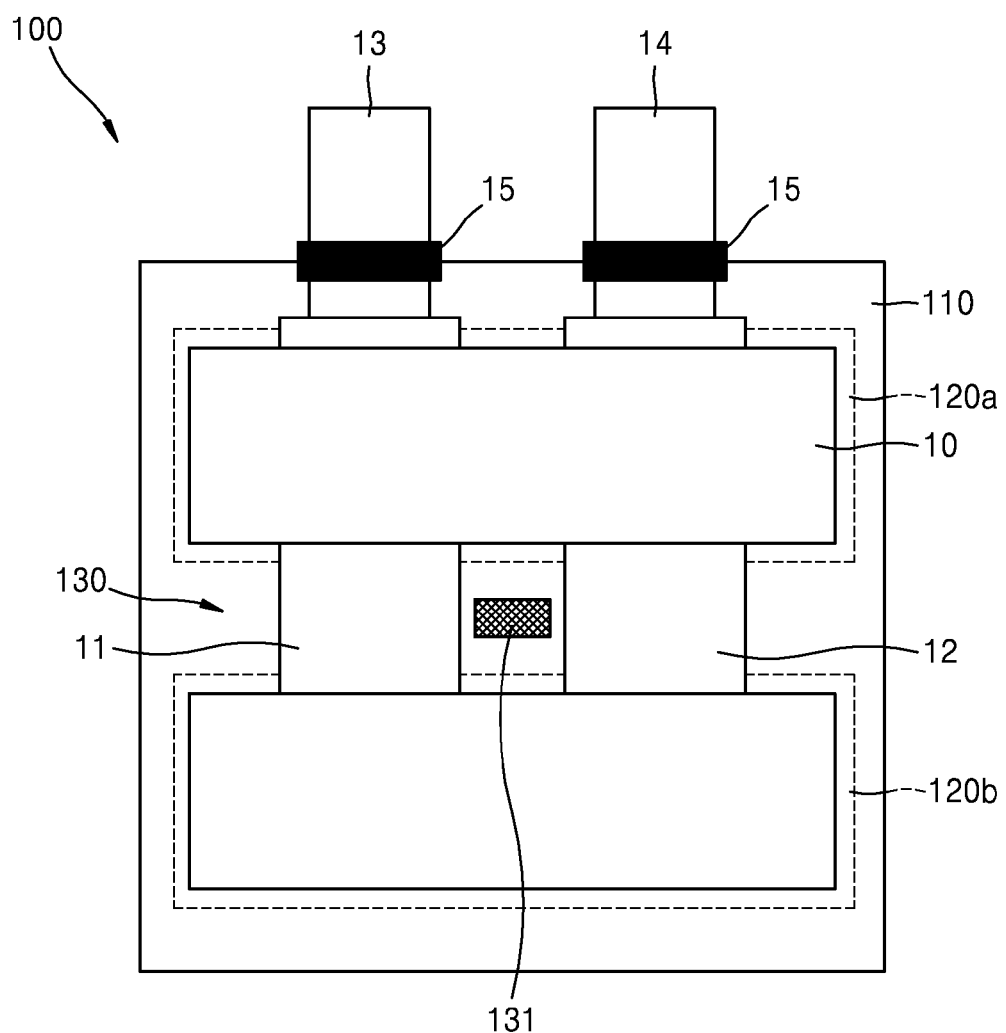
FIG. 7 is a plan view of an example of a position of a bonding portion provided at a connecting portion of the electrochemical device.
Figure 8:
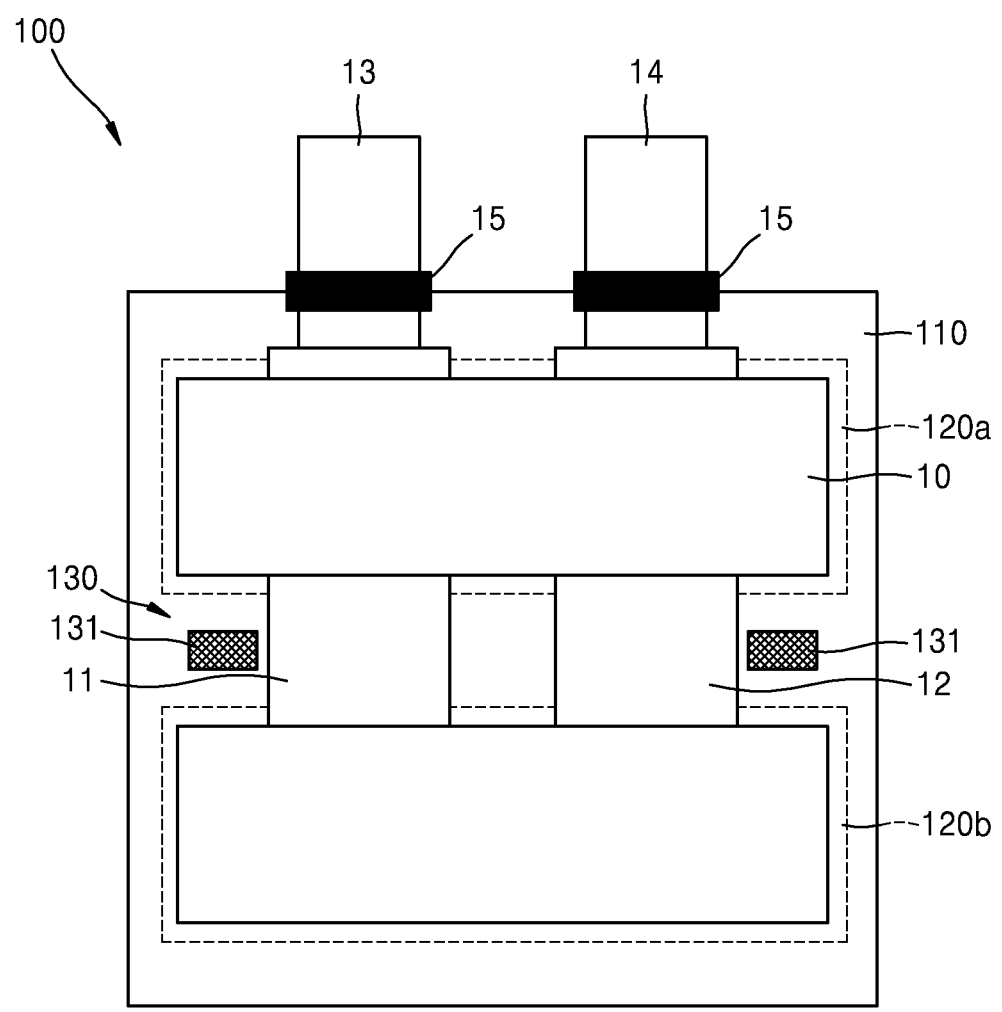
FIG. 8 is a plan view of another example of a position of the bonding portion provided at the connecting portion of the electrochemical device.

Also, when a space between the lower casing member 111 and the upper casing member 112 is increased when the electrochemical device 100 is bent, the electrode assembly 10 disposed in each of the accommodation portions 120a and 120b is moved. When movement of the electrode assembly 10 is too large, a connection between the electrode assembly 10 and the first and second conductive lines 11 and 12 may be disconnected, the first and second conductive lines 11 and 12 may be cut off, a contact between the electrode assemblies 10 may occurs, or the space between the lower casing member 111 and the upper casing member 112 in the connecting portion 130 may be extremely increased so that the bending durability of the electrochemical device 100 may be lowered and problems in the electrochemical device 100 may occur. Thus, in order to prevent the problems in the electrochemical device 100, the lower casing member 111 and the upper casing member 112 in the region of the connecting portion 130 are bonded to each other so that extreme movement of the electrode assembly 10 may be suppressed when the electrochemical device 100 is bent. In an exemplary embodiment, as illustrated in FIG. 7, a bonding portion 131 between the lower casing member 111 and the upper casing member 112 may be provided in a region between the first conductive line 11 and the second conductive line 12 within the connecting portion 130. In an alternative exemplary embodiment, as illustrated in FIG. 8, bonding portions 131 between the lower casing member 111 and the upper casing member 112 may be provided at outer edges of the first conductive line 11 and the second conductive line 12 along widthwise directions within the connecting portion 130. In an exemplary embodiment, the bonding portions 131 may be provided between one edge of the connecting portion 130 and the first conductive line 11 along the widthwise direction and between an opposite edge of the connecting portion 130 and the second conductive line 12 along the widthwise direction, respectively.

Figure 9:
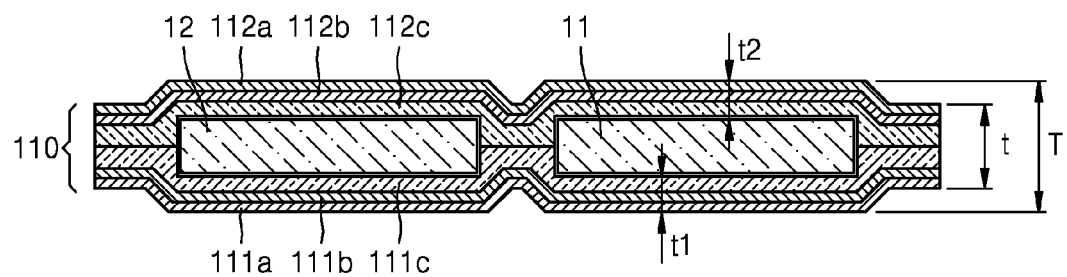
FIG. 9 is a cross-sectional view of a structure of the connecting portion of the electrochemical device, taken along line B-B' of FIG. 1.

FIG. 9 is a cross-sectional view of a structure of the connecting portion 130 of the electrochemical device 100, taken along line B-B' of FIG. 1. Referring to FIG. 9, the first conductive line 11 and the second conductive line 12 are disposed within the connecting portion 130 in parallel, and the sealing layer 111c of the lower casing member 111 is disposed under the first and second conductive lines 11 and 12, and the sealing layer 112c of the upper casing member 112 is disposed on the first and second conductive lines 11 and 12. The gas barrier layer 111b and the outermost layer 111a of the lower casing member 111 are disposed below the sealing layer 111c of the lower casing member 111, and the gas barrier layer 112b and the outermost layer 112a of the upper casing member 112 are disposed above the sealing layer 112c of the upper casing member 112.

Since the first and second conductive lines 11 and 12 are not fully bonded to the sealing layers 111c and 112c, a position change occurs due to bending so that a short between the first and second conductive lines 11 and 12 may occur. Thus, as illustrated in FIG. 9, in order to confine widthwise movement of the first and second conductive lines 11 and 12, the sealing layer 111c of the lower casing member 111 and the sealing layer 112c of the upper casing member 112 within the connecting portion 130 may surround circumferences of the first and second conductive lines 11 and 12. Here, in order for the connecting portion 130 to serve as a path of the electrolyte 20 (refer to FIG. 2), the sealing layers 111c and 112c may not be fully in close contact with the whole surfaces of the first and second conductive lines 11 and 12. It is sufficient that a distance between the sealing layer 111c of the lower casing member 111 and the sealing layer 112c of the upper casing member 112 is less than thicknesses of the first and second conductive lines 11 and 12.

Figure 10:
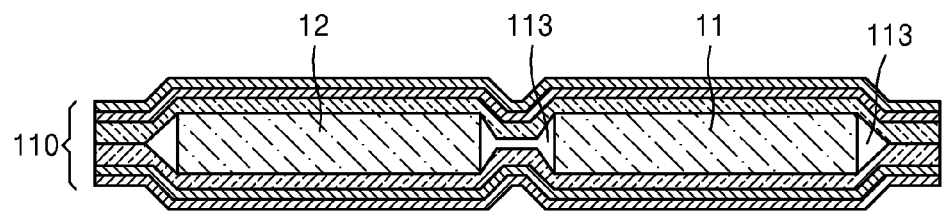
FIG. 10 is a cross-sectional view of a structure of a connecting portion of an electrochemical device, according to another exemplary embodiment.

In an exemplary embodiment, FIG. 10 is a cross-sectional view of a structure of the connecting portion 130 of the electrochemical device 100, according to another exemplary embodiment, for example. As shown in the cross-sectional view of FIG. 10, the sealing layer 111c of the lower casing member 111 and the sealing layer 112c of the upper casing member 112 may be fully bonded to each other only at an edge of the casing member 110, and may be spaced apart from each other by a distance that is less than the thicknesses of the first and second conductive lines 11 and 12 in a region between the first conductive line 11 and the second conductive line 12. Thus, a slight space 113 may be defined between the first conductive line 11 and the second conductive line 12. Also, since the sealing layer 111c of the lower casing member 111 and the sealing layer 112c of the upper casing member 112 are not fully in close contact with side surfaces of the first and second conductive lines 11 and 12, the slight space 113 may be defined at the side surfaces of the first and second conductive lines 11 and 12.

Figure 11:
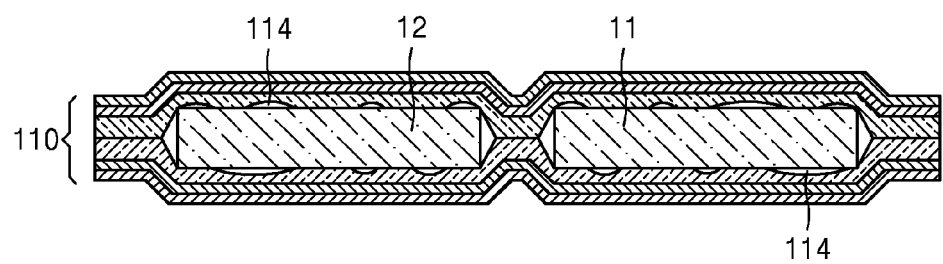
FIG. 11 is a cross-sectional view of a structure of a connecting portion of an electrochemical device, according to another exemplary embodiment.

Also, FIG. 11 is a cross-sectional view of a structure of the connecting portion 130 of the electrochemical device 100, according to another exemplary embodiment. As illustrated in FIG. 11, the sealing layer 111c of the lower casing member 111 and the sealing layer 112c of the upper casing member 112 may be fully bonded to each other between the first conductive line 11 and the second conductive line 12. Small spaces 114 may also be irregularly defined between surfaces of the first and second conductive lines 11 and 12 and the sealing layer 111c of the lower casing member 111 or between the surfaces of the first and second conductive lines 11 and 12 and the sealing layer 112c of the upper casing member 112.

Referring back to FIG. 9, the total thickness T of the connecting portion 130 in which the first and second conductive lines 11 and 12 are disposed, may be greater than a thickness t of the widthwise edge or a center of the connecting portion 130 in which the first and second conductive lines 11 and 12 are not disposed. In an exemplary embodiment, a thickness of a central cross section of the connecting portion 130 may be about 30 µm to about 1,000 µm. However, the sum t1+t2 of a thickness t1 of the lower casing member 111 and a thickness t2 of the upper casing member 112 in the region of the connecting portion 130 in which the first and second conductive lines 11 and 12 are disposed, may be less than the thickness t of the widthwise edge or the center of the connecting portion 130 in which the first and second conductive lines 11 and 12 are not disposed. The thicknesses t1 and t2 of the lower casing member 111 and the upper casing member 112, respectively, may decrease in the region of the connecting portion 130 in which the first and second conductive lines 11 and 12 are disposed, so that the total thickness T of the connecting portion 130 may be reduced and bending durability of the connecting portion 130 may be improved.

Figure 12:
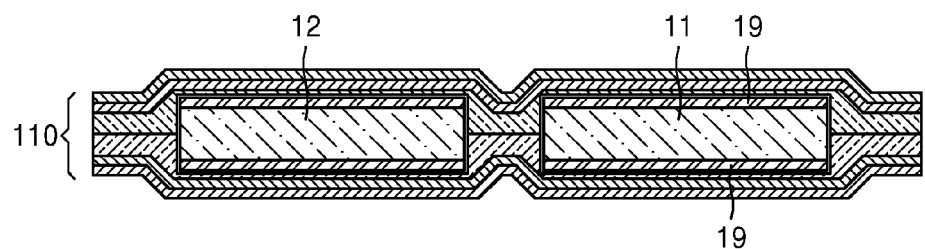
FIG. 12 is a cross-sectional view of a structure of a connecting portion of an electrochemical device, according to another exemplary embodiment.

Also, FIG. 12 is a cross-sectional view of a structure of the connecting portion 130 of the electrochemical device 100, according to another exemplary embodiment. Referring to FIG. 12, insulating layers 19 for preventing an electric short may be further disposed on an upper surface and a lower surface of the first and second conductive lines 11 and 12. In FIG. 12, the insulating layers 19 are disposed on both the upper surface and the lower surface of the first and second conductive lines 11 and 12. However, the invention is not limited thereto, and the insulating layers 19 may also be disposed on one of the upper surface and the lower surface of the first and second conductive lines 11 and 12. In another exemplary embodiment, the insulating layers 19 may be disposed only in partial regions of the upper surface and the lower surface of the first and second conductive lines 11 and 12.

Figure 13:
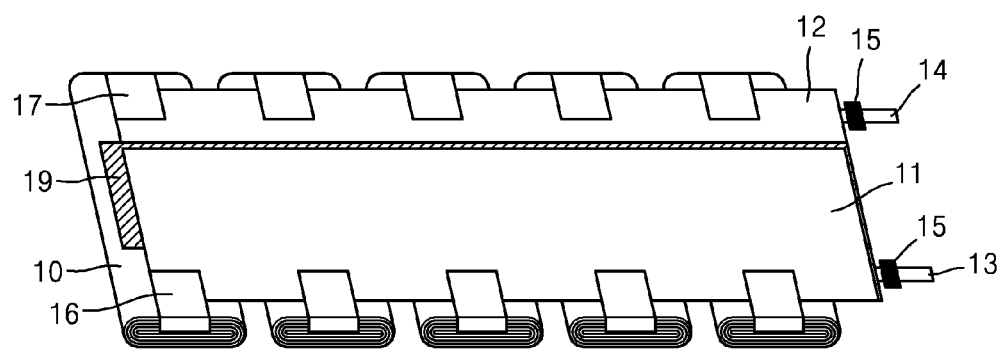
FIG. 13 is a perspective view of another exemplary structure of electrode assemblies and conductive lines disposed in the electrochemical device.

FIG. 13 is a perspective view of another exemplary structure of the electrode assemblies 10 and the first and second conductive lines 11 and 12 disposed in the electrochemical device 100. Referring to FIG. 13, the plurality of electrode assemblies 10 may be arranged in one direction, and the second conductive lines 12 may include a surface which faces outer surfaces of the plurality of electrode assemblies 10. The second conductive line 12 may be electrically connected to each of the electrode assemblies 10 through the plurality of second electrode tabs 17. An insulating layer 19 is disposed on the second conductive line 12, and the first conductive line 11 is disposed on the insulating layer 19. The first conductive line 11 may be electrically connected to each of the electrode assemblies 10 through the plurality of first electrode tabs 16.

As illustrated in FIG. 13, the first and second conductive lines 11 and 12 may not be disposed in parallel on the same plane but may be disposed to overlap each other with the insulating layer 19 between the first and second conductive lines 11 and 12. In FIG. 13, the insulating layer 19 is disposed so that part of the second conductive line 12 and the second electrode tab 17 is exposed, and the first conductive line 11 is disposed in a partial region of the insulating layer 19. In another exemplary embodiment, the insulating layer 19 is not disposed under a portion in which the first conductive line 11 and the first electrode tabs 16 are connected to each other. In this case, the first conductive line 11 and the second conductive line 12 may be disposed so that only central regions between the first conductive line 11 and the second conductive line 12 may overlap each other and edge regions of the first conductive line 11 and the second conductive line 12 may not overlap each other. In an exemplary embodiment, the insulating layer 19 may be disposed to cover the entire region of the second conductive line 12 and the second electrode tab 17. In this case, the insulating layer 19 may also be disposed under the portion in which the first conductive line 11 and the first electrode tabs 16 are connected to each other. The first conductive line 11 and the second conductive line 12 may also be disposed to fully overlap each other.

Figure 14:
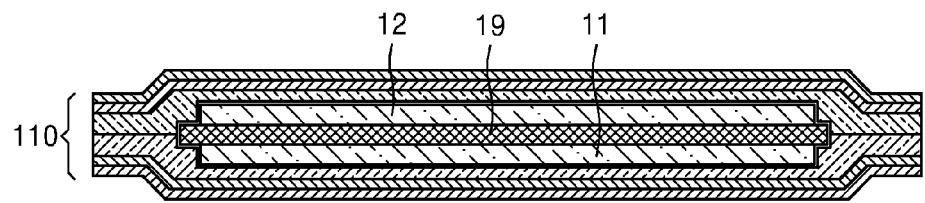
FIGS. 14 through 17 are cross-sectional views of a structure of a connecting portion of an electrochemical device according to the arrangement of electrode assemblies and conductive lines illustrated in FIG. 13.
Figure 15:
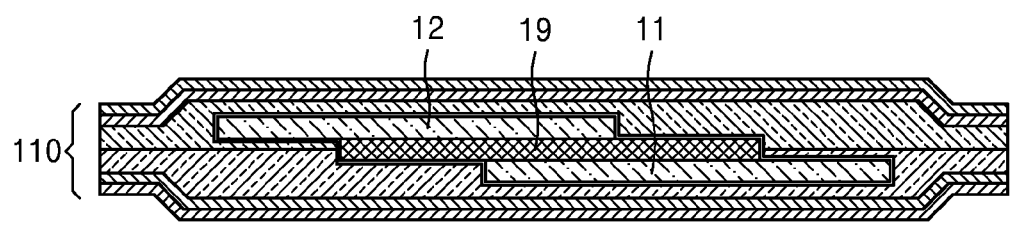
Figure 16:
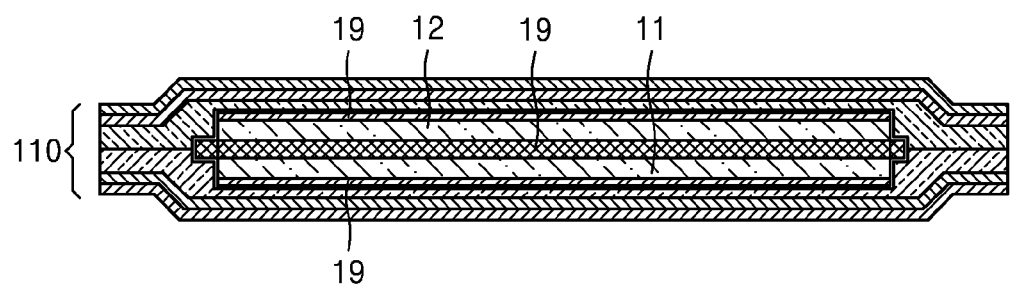
Figure 17:
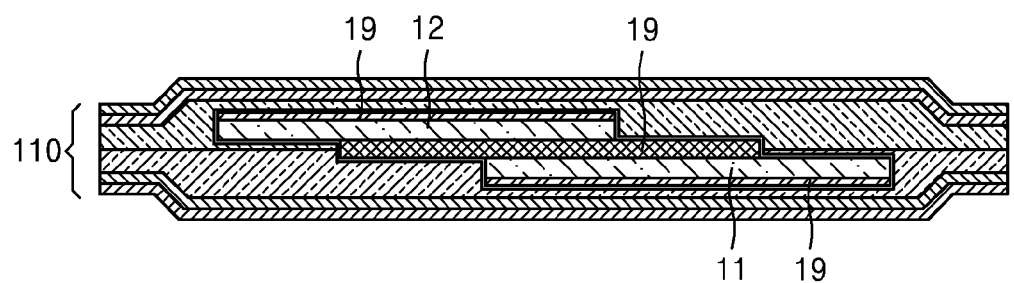

FIGS. 14 through 17 are cross-sectional views of a structure of the connecting portion 130 of the electrochemical device 100 according to the arrangement of the electrode assemblies 10 and the first and second conductive lines 11 and 12 illustrated in FIG. 13. First, as illustrated in FIG. 14, the first conductive line 11 and the second conductive line 12 may be disposed to fully overlap each other with the insulating layer 19 between the first conductive line 11 and the second conductive line 12. Also, as illustrated in FIG. 15, the first conductive line 11 and the second conductive line 12 may be disposed to partially overlap each other with the insulating layer 19 between the first conductive line 11 and the second conductive line 12. Also, as illustrated in FIGS. 16 and 17, an insulating layer 19 may be further disposed on a bottom surface of the first conductive line 11 and a top surface of the second conductive line 12 that are not in contact with the insulating layer 19 which is disposed between the first conductive line 11 and the second conductive line 12 so as to prevent a short. The insulating layer 19 may also be provided only in a partial region of the bottom surface of the first conductive line 11 and a partial region of the top surface of the second conductive line 12 as required.

Figure 18:
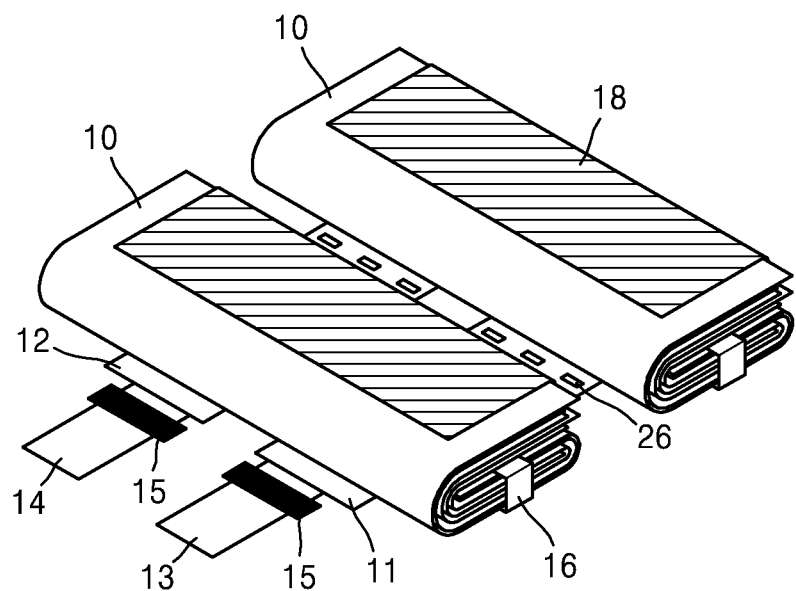
FIG. 18 is a perspective view of another exemplary structure of electrode assemblies and conductive lines disposed in the electrochemical device.

FIG. 18 is a perspective view of another exemplary structure of the electrode assemblies 10 and the first and second conductive lines 11 and 12 disposed in the electrochemical device 100. Referring to FIG. 18, at least one opening 26 may be defined in the first and second conductive lines 11 and 12 that electrically connect the electrode assemblies 10. The opening 26 may be defined in a region between two adjacent electrode assemblies 10, i.e., in a region of the connecting portion 130. When a plurality of openings 26 is defined, the plurality of openings 26 may be arranged along widthwise directions of the first and second conductive lines 11 and 12. At least one opening 26 may increase the flexibility of the first and second conductive lines 11 and 12 in the connecting portion 130 and may improve the bending durability of the electrochemical device 100.

Figure 19:
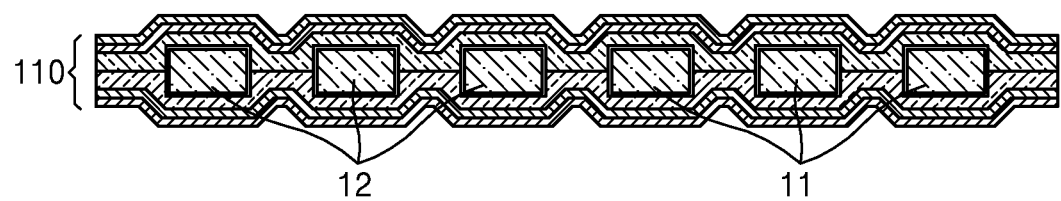
FIG. 19 is a cross-sectional view of a structure of a connecting portion of an electrochemical device according to the arrangement of electrode assemblies and conductive lines illustrated in FIG. 18.

FIG. 19 is a cross-sectional view of a structure of the connecting portion 130 of the electrochemical device 100 according to the arrangement of the electrode assemblies 10 and the first and second conductive lines 11 and 12 illustrated in FIG. 18. Referring to FIG. 19, an outer surface of the casing member 110 in the connecting portion 130 may be provided to be bent according to shapes of the first and second conductive lines 11 and 12. In an exemplary embodiment, the total thickness of the connecting portion 130 in a region between the first conductive line 11 and the second conductive line 12, in widthwise edges of both sides of the connecting portion 130, and in a region in which the openings 26 of the first conductive line 11 and the second conductive line 12 are located, may be relatively small, and the thickness of the connecting portion 130 in a region in which the first and second conductive lines 11 and 12 are located, may be relatively large. The sealing layer 111c of the lower casing member 111 and the sealing layer 112c of the upper casing member 112 may be at least partially filled in the openings 26 of the first conductive line 11 and the second conductive line 12. The sealing layers 111c and 112c are filled in the openings 26 so that lengthwise and widthwise movements of the first conductive line 11 and the second conductive line 12 may be confined.

Figure 20:
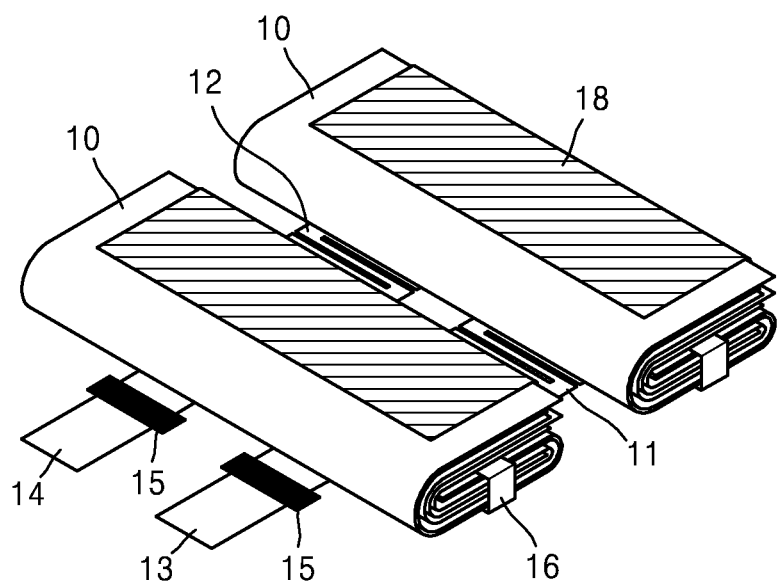
FIG. 20 is a perspective view of another exemplary structure of electrode assemblies and conductive lines disposed in the electrochemical device.

FIG. 20 is a perspective view of another exemplary structure of the electrode assemblies 10 and the first and second conductive lines 11 and 12 disposed in the electrochemical device 100. Referring to FIG. 20, widths of the first and second conductive lines 11 and 12 may be reduced, and the first and second conductive lines 11 and 12 may have zigzag shapes in a region between two adjacent electrode assemblies 10, i.e., in the region of the connecting portion 130. The first and second conductive lines 11 and 12 having zigzag shapes may increase the flexibility of the first and second conductive lines 11 and 12 and may improve the bending durability of the electrochemical device 100.

FIGS. 21 to 29 are cross-sectional views of structures of various electrochemical devices 100 according to other exemplary embodiments.

Figure 21:
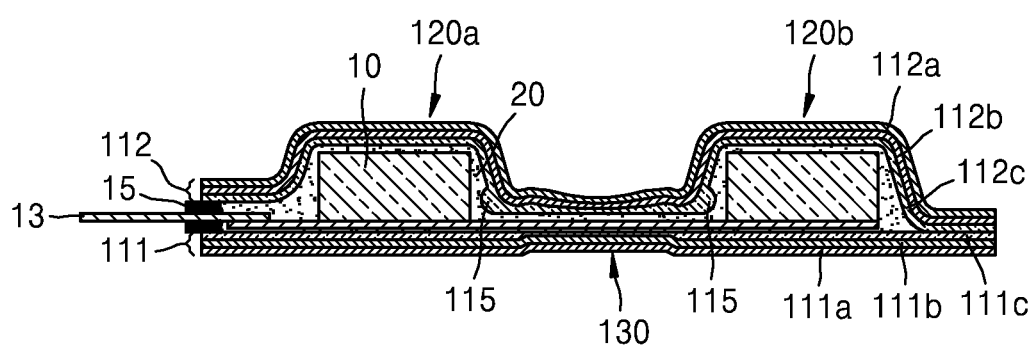
FIGS. 21 to 29 are cross-sectional views of structures of various electrochemical devices according to other exemplary embodiments.

First, referring to FIG. 21, the electrochemical device 100 may further include a reinforcement member 115 provided at widthwise edges of the connecting portion 130, i.e., a border region between the accommodation portions 120a and 120b and the connecting portion 130. The reinforcement member 115 is used to improve the durability of the casing member 110. Since deformation is concentrated in lengthwise edges of both sides of the connecting portion 130 when the electrochemical device 100 is bent, when the electrochemical device 100 is repeatedly bent, the casing member 110 may also be damaged in the lengthwise edges of both sides of the connecting portion 130. The reinforcement member 115 may disperse deformation in a deformed portion by alleviating deformation from being concentrated in the lengthwise edges of both sides of the connecting portion 130, thereby improving the durability of the electrochemical device 100.

In an exemplary embodiment, the reinforcement member 115 may be provided by the sealing layer 112c of the upper casing member 112, for example. As illustrated in FIG. 21, the thickness of the sealing layer 112c in the border region between the accommodation portions 120a and 120b and the connecting portion 130 may be greater than that in other regions. Thus, the reinforcement member 115 may be a protruded part of the sealing layer 112c. The reinforcement member 115 may protrude toward side surfaces of the electrode assemblies 10. Also, the lower casing member 111 may include the reinforcement member 115 provided at widthwise edges of the connecting portion 130. Then, the deformation in the deformed portion when the electrochemical device 100 is bent may be dispersed into the central region of the connecting portion 130.

Figure 22:
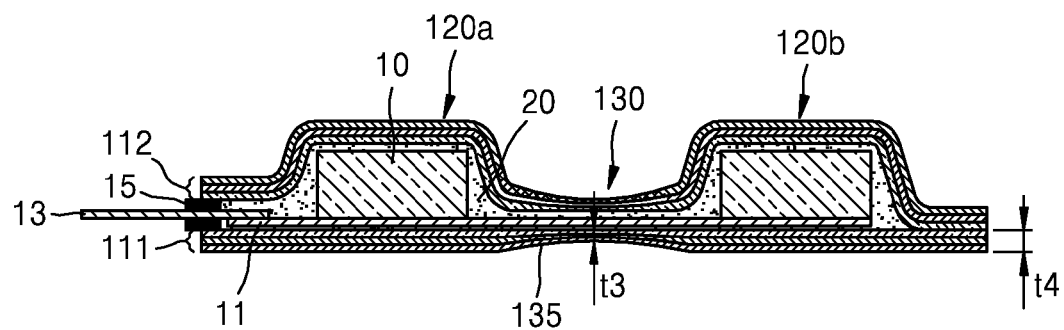

Also, referring to FIG. 22, the central region of the connecting portion 130 may be provided thinner than other regions so that the deformation in the deformed portion when the electrochemical device 100 is bent may be dispersed into the central region of the connecting portion 130. In an exemplary embodiment, a thickness t4 of the lengthwise edges of the lower casing member 111 may be greater than a thickness t3 of the central region of the connecting portion 130. As illustrated in FIG. 22, by pressing the central region of the connecting portion 130, the outermost layer 111a, the gas barrier layer 111b, and the sealing layer 111c of the lower casing member 111 in the central region of the connecting portion 130 may be compressed overall. Then, the thicknesses of the outermost layer 111a, the gas barrier layer 111b, and the sealing layer 111c of the lower casing member 111 in the central region of the connecting portion 130 may be reduced, compared to those in other regions. In particular, the thicknesses of the outermost layer 111a, the gas barrier layer 111b, and the sealing layer 111c may gradually decrease toward the center of the connecting portion 130 from the lengthwise edges of the connecting portion 130. Thus, a concave curved surface 135 may be provided in a surface of the outermost layer 111a. In an exemplary embodiment, the above-described features may also apply to the upper casing member 112.

Figure 23:
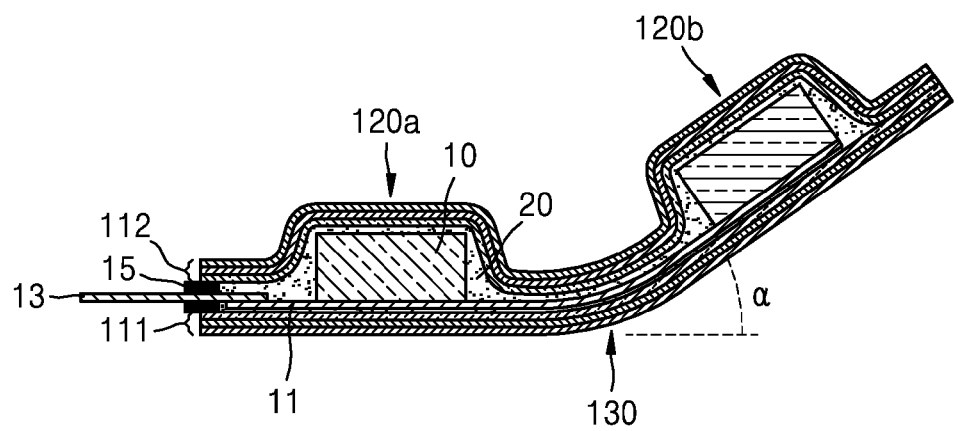

Referring to FIG. 23, the electrochemical device 100 may be bent in a free state in which no force is applied to the electrochemical device 100. That is, the connecting portion 130 may be bent so that the first accommodation portion 120a and the second accommodation portion 120b may be inclined with respect to each other. In an exemplary embodiment, an angle α defined between the bottom surface of the electrode assembly 10 disposed in the first accommodation portion 120a and the bottom surface of the electrode assembly 10 disposed in the second accommodation portion 120b may be in the range of about 10 degrees (°) to about 160°.

Figure 24:
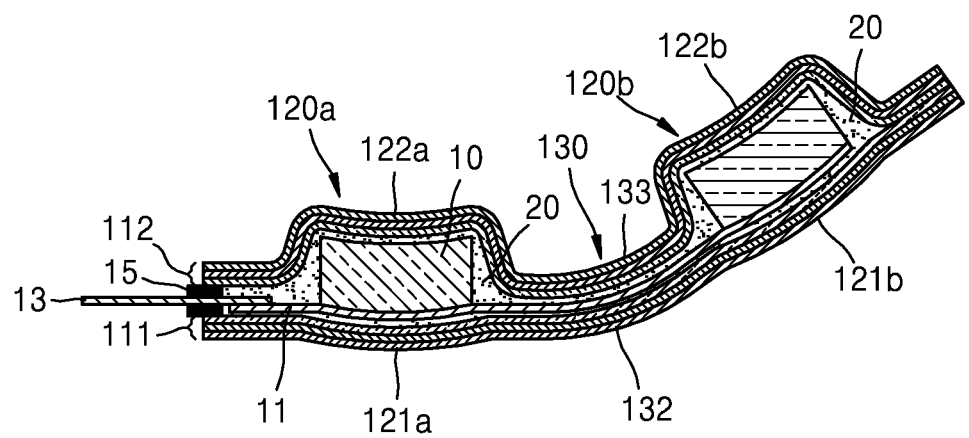

Also, referring to FIG. 24, outer surfaces 121a, 122a, 121b, and 122b of the plurality of accommodation portions 120a and 120b of the electrochemical device 100 and outer surfaces 132 and 133 of the connecting portion 130 may be curved. In an exemplary embodiment, the bottom outer surfaces 121a and 121b of the accommodation portions 120a and 120b may be convexly curved, and the top outer surfaces 122a and 122b of the accommodation portions 120a and 120b may be concavely curved. Similarly, the bottom outer surface 132 of the connecting portion 130 may be convexly curved, and the top outer surface 133 of the connecting portion 130 may be concavely curved. In addition, the bottom surface of the electrode assembly 10 may also be convexly curved, and the top surface of the electrode assembly 10 may also be concavely curved. Also, a partial region of the first conductive line 11 that faces the bottom surface of the electrode assembly 10 may also be curved in the same shape as that of the bottom surface of the electrode assembly 10. Thus, the electrochemical device 100 may be curved overall.

A center of curvature of the curved electrochemical device 100, as shown in FIG. 24, is located in a direction of the upper casing member 112. However, the electrochemical device 100 may be curved in contrary to as shown in FIG. 24, so that the center of curvature of the electrochemical device 100 may be located in a direction of the lower casing member 111. In this case, bottom outer surfaces 121a and 121b of the accommodation portions 120a and 120b may be concavely curved, and top outer surfaces 122a and 122b of the accommodation portions 120a and 120b may be convexly curved. Also, the bottom outer surface 132 of the connecting portion 130 may be concavely curved, and the top outer surface 133 of the connecting portion 130 may be convexly curved. Similarly, the bottom surface of the electrode assembly 10 may be concavely curved, and the top surface of the electrode assembly 10 may be convexly curved.

Figure 25:
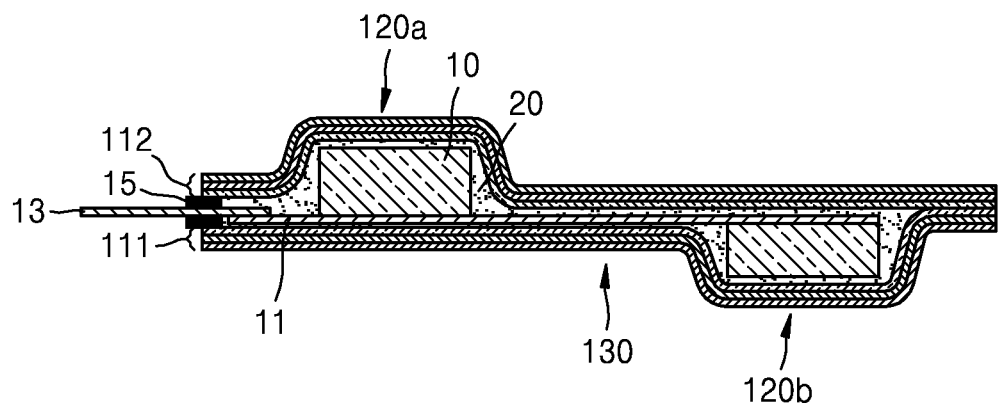
Figure 26:
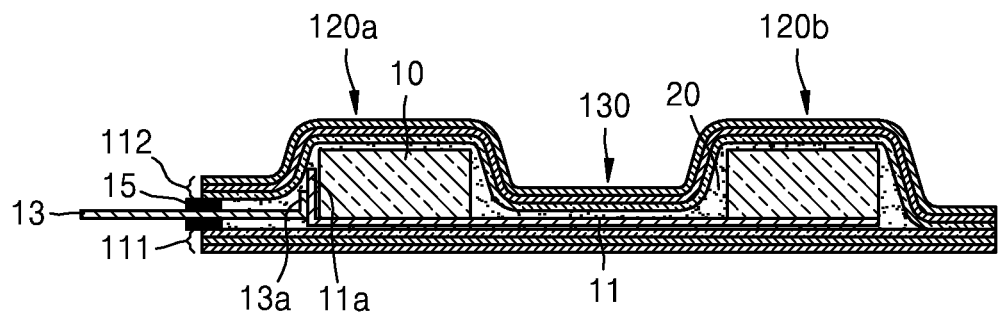

Also, as illustrated in FIG. 25, at least two electrode assemblies 10 may be disposed on the top and bottom surfaces of the first conductive line 11, respectively, and do not to overlap each other. In FIG. 25, only two electrode assemblies 10 are illustrated. However, the invention is not limited thereto, and three or more electrode assemblies 10 may be alternately arranged at different positions of the top and bottom surfaces of the first conductive line 11 along a lengthwise direction in which the three or more electrode assemblies 10 are arranged. In this case, the first accommodation portion 120a may be provided in the upper casing member 112, and the second accommodation portion 120b may be provided in the lower casing member 111.

In the illustrated exemplary embodiment, the first conductive line 11 and the first lead tab 13 have a straight line shape in which they are not bent. However, the shape of a portion in which the first conductive line 11 and the first lead tab 13 are connected to each other may be configured in various ways. In an exemplary embodiment, referring to FIG. 26, a part 11a of the first conductive line 11 may be bent toward a front of the electrode assembly 10 that is directly adjacent to the first lead tab 13 at about 90°. Similarly, a part 13a of the first lead tab 13 located in the casing member 110 may also be bent toward the front of the electrode assembly 10 that is directly adjacent to the first lead tab 13 at about 90°. The bent part 11a of the first conductive line 11 and the bent part 13a of the first lead tab 13 may be bonded to each other. In exemplary embodiments, bonding of the part 11a of the first conductive line 11 and the part 13a of the first lead tab 13 may be performed by welding, soldering, conductive adhesion, compression, riveting, or pressing contact, for example.

Figure 27:
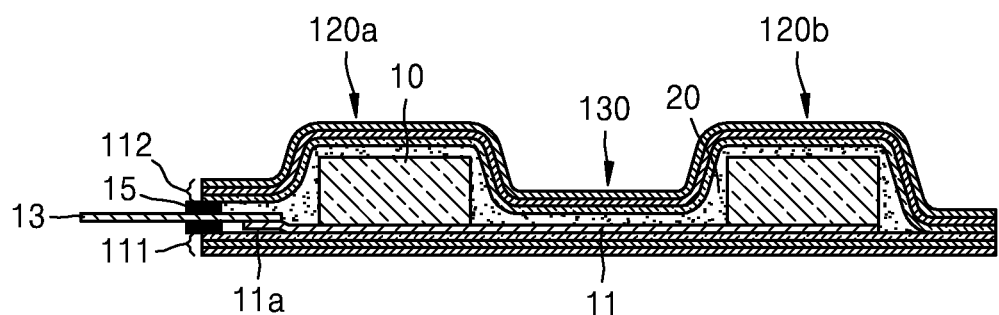

Also, referring to FIG. 27, when a height at which the first lead tab 13 is disposed and a height at which the first conductive line 11 is disposed do not coincide with each other in the casing member 110, the part 11a of the first conductive line 11 may be slantly bent so that a height of an end of the first conductive line 11 may coincide with the height of the first lead tab 13. The part 11a of the first conductive line 11 that is slantly bent may be bonded to the first lead tab 13. Also, a part of the first lead tab 13 may be slantly bent so that the height of the end of the first lead tab 13 may coincide with the height of the first conductive line 11, instead of bending the part 11a of the first conductive line 11. In this case, a part of the slantly-bent lead tab 13 may be bonded to the first conductive line 11.

Figure 28:
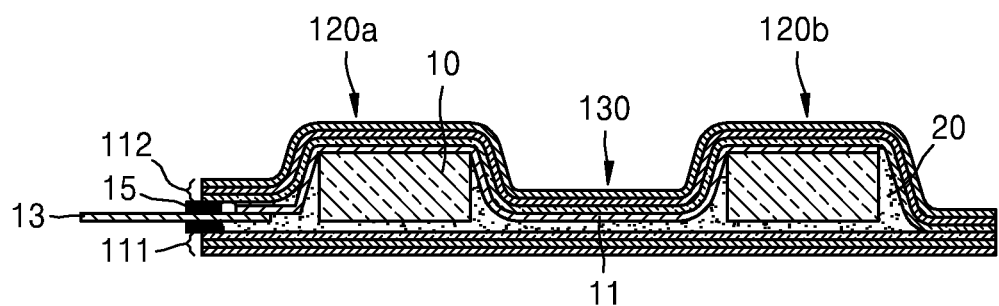

So far, the first conductive line 11 is disposed between the bottom surface of the electrode assembly 10 and the lower casing member 111. However, as illustrated in FIG. 28, the first conductive line 11 may also be disposed on the top surface of the electrode assembly 10. In this case, the first conductive line 11 may have a shape that is bent along the surface of the upper casing member 112 that is bent due to the first and second accommodation portions 120a and 120b and the connecting portion 130. The first conductive line 11 may be bent toward the front of the electrode assembly 10 that is directly adjacent to the first lead tab 13 and thus may be bonded to the first lead tab 13.

Figure 29:
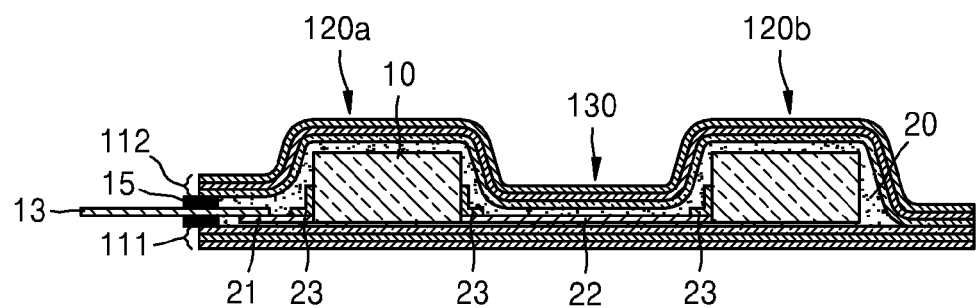

Also, referring to FIG. 29, instead of using one first conductive line 11 that extends long, separate conductive lines 21 and 22 may also be disposed between the first lead tab 13 and the electrode assembly 10 and between two adjacent electrode assemblies 10, respectively. In an exemplary embodiment, a conductive line 21 that electrically connects the first lead tab 13 and the electrode assembly 10 may be disposed between the first lead tab 13 and the electrode assembly 10, and a separate conductive line 22 that electrically connects the two electrode assemblies 10 may be disposed between two electrode assemblies 10 disposed in the first and second accommodation portions 120a and 120b. In FIG. 29, only two electrode assemblies 10 are shown. However, when three or more electrode assemblies 10 are disposed, a separate conductive line 22 may be respectively disposed between adjacent electrode assemblies 10. Also, an electrode tab 23 for connecting the conductive lines 21 and 22 and the electrode assembly 10 may be further disposed on side surfaces of the electrode assembly 10. In an exemplary embodiment, the electrode tab 23 may include a first portion and a second portion that are bent at about 90°. The first portion of the electrode tab 23 may be disposed to be in contact with the side surfaces of the electrode assembly 10, and the second portion of the electrode tab 23 that is bent with respect to the first portion at 90° may be disposed to be in contact with surfaces of the conductive lines 21 and 22.

Figure 30:
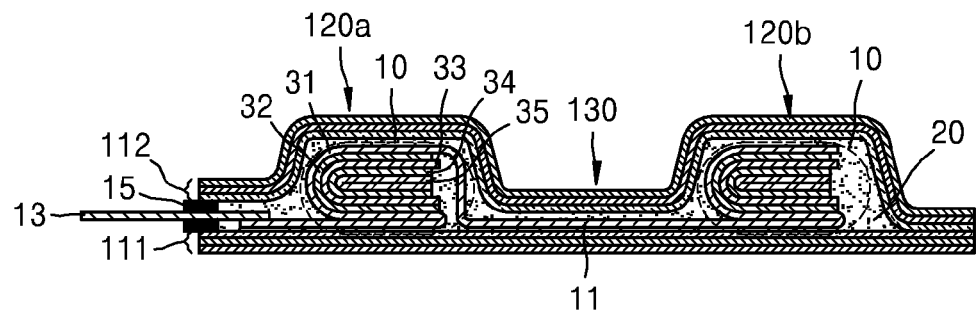
FIG. 30 is a cross-sectional view of a structure of electrode assemblies and conductive line disposed in the electrochemical device.

FIG. 30 is a cross-sectional view of a structure of the electrode assemblies 10 and the first conductive line 11 disposed in the electrochemical device Referring to FIG. 30, each of the electrode assemblies 10 may comprise a first current collector 31, a first active material layer 32 coated on the first current collector 31, a separator 33, a second current collector 34, and a second active material layer 35 coated on the second current collector 34. In an exemplary embodiment, the first current collector 31 may be a positive current collector, and the first active material layer 32 may be provided by mixing a positive active material, a conductive agent, and a binder. Also, the second current collector 34 may be a negative current collector, and the second active material layer 35 may be provided by mixing a negative active material, a conductive agent, and a binder. The separator 33 may electrically separate the first current collector 31 and first active material layer 32 from the second current collector 34 and the second active material layer 35.

The first conductive line 11 and the first current collector 31 may be unitary. In an exemplary embodiment, after coating the first active material layer 32 on a portion of a metal foil, the separator 33, the second current collector 34, and the second active material layer 35 may be sequentially disposed on the first active material layer 32. Then, the electrode assemblies 10 may be provided by bending or folding the first active material layer 32, the separator 33, the second current collector 34, and the second active material layer 35 together with the portion of the metal foil. In the metal foil, the portion on which the first active material layer 32 is coated may be the first current collector 31 and the other portion may be the first conductive line 11.

In FIG. 30, it is shown that both first current collectors 31 of the two electrode assemblies 10 and the first conductive line 11 are unitary. However, embodiments are not limited thereto. In an exemplary embodiment, one first current collector 31 of the two electrode assemblies 10 and the first conductive line 11 may be unitary. But the other first current collector 31 may be separately provided from the first conductive line 11 and then bonded to the first conductive line 11.

It should be understood that the exemplary embodiments described therein should be considered in a descriptive sense only and not for purposes of limitation. Descriptions of features or exemplary embodiments within each exemplary embodiment should typically be considered as available for other similar features or exemplary embodiments in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. An electrochemical device comprising:
   a first electrode assembly and a second electrode assembly which are separate from each other;
   at least one conductive line which electrically connects the first electrode assembly and the second electrode assembly;

a casing member which packages the first and second electrode assemblies and comprises a first accommodation portion in which the first electrode assembly is accommodated, a second accommodation portion in which the second electrode assembly is accommodated, and a connecting portion which connects the first accommodation portion to the second accommodation portion; and an electrolyte disposed in the casing member, wherein a thickness of the connecting portion is less than one of a thickness of the first accommodation portion and a thickness of the second accommodation portion in a cross section, and a path for the at least one conductive line and the electrolyte is defined in the connecting portion.

2. The electrochemical device of claim 1, wherein the casing member comprises a lower casing member and an upper casing member, and a space is defined between the lower casing member and the upper casing member so that the path for the at least one conductive line and the electrolyte is disposed between the lower casing member and the upper casing member.

3. The electrochemical device of claim 2, wherein a thickness of the connecting portion in a region in which the at least one conductive line is located is greater than a thickness of the connecting portion in a region in which the at least one conductive line is not located.

4. The electrochemical device of claim 2, wherein a thickness of the connecting portion in at least a region in which the at least one conductive line is not located is larger than a sum of a thickness of the lower casing member and a thickness of the upper casing member of the connecting portion in a region in which the at least one conductive line is located.

5. The electrochemical device of claim 2, wherein a space is defined between a surface of the at least one conductive line and the lower or upper casing member.

6. The electrochemical device of claim 2, wherein a concave curved surface is disposed on a surface of the lower casing member or the upper casing member in a region of the connecting portion.

7. The electrochemical device of claim 2, wherein the at least one conductive line comprises a first conductive line and a second conductive line which are spaced apart from each other and disposed in parallel on the same plane, and the lower casing member and the upper casing member are bonded to each other in at least one region among a region between the first conductive line and the second conductive line in the connecting portion, a region between a first edge of the connecting portion and the first conductive line, and a region between a second edge of the connecting portion and the second conductive line.

8. The electrochemical device of claim 2, wherein the first and second electrode assemblies are disposed to face a top surface of the at least one conductive line, and the lower casing member is disposed to face bottom surfaces of the first and second electrode assemblies, and the upper casing member is disposed on the first and second electrode assemblies and has shapes of the first and second accommodation portions and the connecting portion.

9. The electrochemical device of claim 2, wherein the first electrode assembly is disposed to face a top surface of the at least one conductive line, and the second electrode assembly is disposed to face a bottom surface of the at least one conductive line, and the first accommodation portion is disposed in the upper casing member, and the second accommodation portion is disposed in the lower casing member.

10. The electrochemical device of claim 2, wherein each of the lower casing member and the upper casing member comprises an outermost layer, a gas barrier layer, and a sealing layer.

11. The electrochemical device of claim 2, wherein the casing member further comprises a reinforcement member disposed in a border region between the first accommodation portion and the connecting portion or between the second accommodation portion and the connecting portion.

12. The electrochemical device of claim 1, wherein at least one of a top surface of the first accommodation portion, a bottom surface of the first accommodation portion, a top surface of the second accommodation portion, and a bottom surface of the second accommodation portion includes a curved surface.

13. The electrochemical device of claim 12, wherein at least one of a top surface of the first electrode assembly, a bottom surface of the first electrode assembly, a top surface of the second electrode assembly, and a bottom surface of the second electrode assembly includes a curved surface.

14. The electrochemical device of claim 1, wherein the connecting portion is bent so that the first accommodation portion is inclined with respect to the second accommodation portion.

15. The electrochemical device of claim 1, wherein the at least one conductive line is a sheet-type conductive line which extends between the first accommodation portion and the second accommodation portion through the connecting portion in the casing member and comprises a sheet region, and a width of the sheet region is greater than a thickness of the sheet region.

16. The electrochemical device of claim 1, wherein the at least one conductive line comprises a first conductive line and a second conductive line which connect the first and second electrode assemblies together in parallel, and the electrochemical device further comprises first electrode tabs which electrically connect the first and second electrode assemblies to the first conductive line and second electrode tabs which electrically connect the first and second electrode assemblies to the second conductive line.

17. The electrochemical device of claim 16, further comprising an insulating layer, wherein the at least one conductive line is disposed on a bottom surface of the insulating layer or a top surface of the insulating layer.

18. The electrochemical device of claim 1, wherein each of the first and second electrode assemblies comprises a current collector, and at least one of the current collectors of the first and second electrode assemblies and the at least one conductive line are unitary.

19. The electrochemical device of claim 1, wherein a width of the at least one conductive line in a region of the connecting portion is less than that in other regions.

20. The electrochemical device of claim 1, further comprising at least one lead tab which is drawn to an outside of the casing member and is electrically connected to the at least one conductive line in the casing member.

21. The electrochemical device of claim 20, wherein a part of the at least one conductive line is bent in the casing member and the bent part of the at least one conductive line and the at least one lead tab are bonded to each other.

22. The electrochemical device of claim 20, wherein a height of the at least one lead tab and a height of the at least one conductive line do not coincide with each other in the casing member, and a part of the lead tab or the at least one conductive line is slantly bent and is bonded to the at least one conductive line or the at least one lead tab.

23. The electrochemical device of claim 20, wherein the at least one conductive line comprises a third conductive line disposed between the first electrode assembly and the second electrode assembly, and the electrochemical device further comprises electrode tabs which electrically connect the third conductive line to the first and second electrode assemblies and are led out from each of the first and second electrode assemblies.

24. The electrochemical device of claim 1, wherein the at least one conductive line has a shape in which the at least one conductive line is bent along surfaces of the first accommodation portion and the connecting portion or along surfaces of the second accommodation portion and the connecting portion.

* * * * *